United States Patent
Kesseli

[19]

[11] Patent Number: 5,992,139
[45] Date of Patent: Nov. 30, 1999

[54] TURBINE ENGINE WITH TURBOCOMPRESSOR FOR SUPPLYING ATOMIZING FLUID TO TURBINE ENGINE FUEL SYSTEM

[75] Inventor: James B. Kesseli, Greenland, N.H.

[73] Assignee: Northern Research & Engineering Corp., Woburn, Mass.

[21] Appl. No.: 08/963,075

[22] Filed: Nov. 3, 1997

[51] Int. Cl.⁶ .................................................. F02C 7/22
[52] U.S. Cl. ........................................ 60/39.183; 60/740
[58] Field of Search ............................ 60/39.07, 39.183, 60/734, 740

[56] References Cited

U.S. PATENT DOCUMENTS

| | | |
|---|---|---|
| 3,901,026 | 8/1975 | Quinn. |
| 5,185,997 | 2/1993 | Nishijima ............................... 60/39.07 |
| 5,452,573 | 9/1995 | Glickstein et al. .................. 60/39.183 |

FOREIGN PATENT DOCUMENTS 0 014 075   8/1980   European Pat. Off. .

*Primary Examiner*—Louis J. Casaregola
*Attorney, Agent, or Firm*—Michael M. Gnibus

[57] ABSTRACT

An apparatus for supplying high pressure atomizing and purging fluid to the fuel system of a gas turbine engine. The apparatus is comprised of a turbocompressor, multiple flow conduits and associated valves and controls. Alternative versions of the fundamental apparatus may include heat exchangers for heating and cooling the atomizing and purging fluid within the apparatus. The apparatus works with all types of gas turbine engine cycles well known to one skilled in the art. The apparatus includes a first conduit for extracting a small percentage of the fluid compressed by the turbine engine compressor, and the first conduit is further divided into second and third conduits for supplying portions of the small percentage of compressed fluid to the turbocompressor compressor and turbine. The portion of the fluid flowed to the turbocompressor compressor is compressed and then flowed to the turbine engine fuel system at a location that enhances atomization of the fuel or purges the fuel from the fuel system nozzle after shut-off. The fluid discharged from the turbocompressor turbine is flowed back to the turbine engine to offset engine efficiency losses. The turbocompressor may be configured in any number of mechanical configurations, familiar to one skilled in the art of turbomachinery.

13 Claims, 1 Drawing Sheet

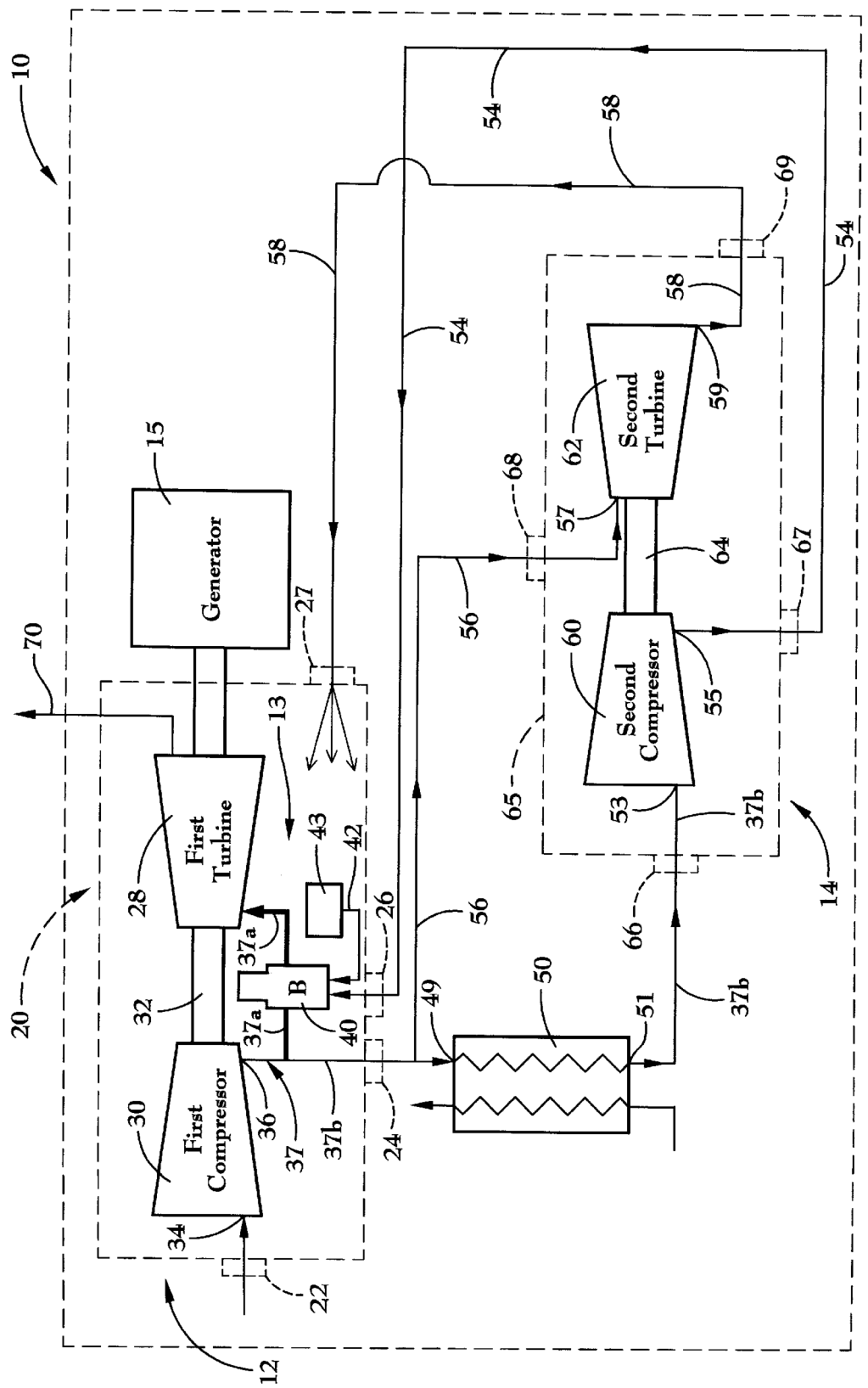

TURBINE ENGINE WITH TURBOCOMPRESSOR FOR SUPPLYING ATOMIZING FLUID TO TURBINE ENGINE FUEL SYSTEM

BACKGROUND OF THE INVENTION

The invention relates to a turbine engine with a turbine engine fuel system, and more particularly to a turbine engine that includes a turbocompressor for supplying high pressure compressed atomizing fluid to the turbine engine fuel system.

High pressure air is commonly supplied to liquid fuel nozzles in gas turbine engine fuel systems to improve the atomization of the fuel droplets, help cool the fuel nozzles and also to provide purge capability to remove residual fuel and other liquid in the nozzles when switching from a liquid fuel to a natural gas fuel. It is necessary that such high pressure atomizing air be flowed to the fuel nozzles at pressures about 20% higher than the pressure of air that is typically supplied to a fuel system combustion chamber(e.g. 10–30 bars), and with a mass flow rate that may be up to three times that of the fuel mass flow rate.

In order to achieve the required pressure and mass flow rate requirements, conventional compression systems designed to boost atomizing air pressure typically use reciprocating compressors that are driven by an electric motor. The resulting atomizing systems are large and expensive and do not deliver high pressure atomizing air to the gas turbine engine fuel system at a steady flow rate. Because of the nature of such reciprocating or piston type compressors, the supplied pressurized atomizing air may include a pressure pulsation which produces a pressure increase or pulse in the supplied atomizing air, and these pulsations contribute to combustion instability in the gas turbine engine fuel system, and may also contribute to fretting in fuel system supply lines or conduits.

An additional problem with the conventional motor driven approach to providing atomizing air to gas turbine engine fuel systems is the circumstances surrounding a loss of utility power. In the event of a power failure, the motor driving the reciprocating compressor will stop and the flow of pressurized atomizing air to the gas turbine engine fuel system fuel system components such as the fuel nozzles is immediately interrupted causing the fuel nozzles to coke and clog. Since the power required to operate the compressor is on the order of 20 kW providing battery backup is impractical and adds cost and complexity to the atomizing air supply system.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In a preferred embodiment, the invention is an apparatus for supplying high pressure atomizing and purging fluid to the fuel system of a gas turbine engine. The apparatus is comprised of a turbocompressor, multiple flow conduits and associated valves and controls. Alternative versions of the fundamental apparatus may include heat exchangers for heating and cooling the atomizing and purging fluid within the apparatus. The apparatus works with all types of gas turbine engine cycles well known to one skilled in the art. The apparatus includes a first conduit for extracting a small percentage of the fluid compressed by the turbine engine compressor, and the first conduit is further divided into second and third conduits for supplying portions of the small percentage of compressed fluid to the turbocompressor compressor and turbine. The portion of the fluid flowed to the turbocompressor compressor is compressed and then flowed to the turbine engine fuel system at a location that enhances atomization of the fuel or purges the fuel from the fuel system nozzle after shut-off. The fluid discharged from the turbocompressor turbine is flowed back to the turbine engine to offset engine efficiency losses. The turbocompressor may be configured in any number of mechanical configurations, familiar to one skilled in the art of turbomachinery.

In one aspect of the present invention, this is accomplished by providing an apparatus for supplying high pressure atomizing fluid to a turbine engine fuel system. The apparatus includes a turbine engine comprising a first fluid compressor for supplying a first volume of compressed fluid; a first turbine operably connected to the first fluid compressor to drive the first fluid compressor; a fuel system; and a first conduit flow connecting the combustor to the first fluid compressor and to the first turbine, the first conduit being adapted to supply a first portion of the first volume of compressed fluid to the fuel system. The apparatus further includes a turbocompressor comprising a second fluid compressor driven by a second turbine, said first conduit further flow connecting the first fluid compressor and the second fluid compressor, and wherein a second portion of the first volume of compressed fluid is supplied to the second fluid compressor through the first conduit. Additionally, the apparatus includes a second conduit flow connecting the second fluid compressor and the combustor and whereby the second volume of compressed fluid is supplied to the combustor.

The turbocompressor of the apparatus of the present invention serves as a reliable means for supplying high pressure atomizing fluid such as air to the turbine engine fuel system while the main turbine engine is operating and while the turbine engine spools down. Atomizing fluid is supplied at a constant pressure and as a result, combustion instabilities are eliminated, and coking and clogging of turbine engine fuel system components is prevented by the present invention.

The foregoing and other aspects will become apparent from the following detailed description of the invention when considered in conjunction with the accompanying drawing FIGURE.

DESCRIPTION OF THE DRAWING FIGURE

In a preferred embodiment, the invention is an apparatus for supplying high pressure atomizing and purging fluid to the fuel system of a gas turbine engine. The apparatus is comprised of a turbocompressor, multiple flow conduits and associated valves and controls. Alternative versions of the fundamental apparatus may include heat exchangers for heating and cooling the atomizing and purging fluid within the apparatus. The apparatus works with all types of gas turbine engine cycles well known to one skilled in the art. The apparatus includes a first conduit for extracting a small percentage of the fluid compressed by the turbine engine compressor, and the first conduit is further divided into second and third conduits for supplying portions of the small percentage of compressed fluid to the turbocompressor compressor and turbine. The portion of the fluid flowed to the turbocompressor compressor is compressed and then flowed to the turbine engine fuel system at a location that enhances atomization of the fuel or purges the fuel from the fuel system nozzle after shut-off. The fluid discharged from the turbocompressor turbine is flowed back to the turbine engine to offset engine efficiency losses. The turbocompressor may be configured in any number of mechanical configurations, familiar to one skilled in the art of turbomachinery.

The FIGURE is a schematic representation of the apparatus of the present invention that includes a turbocompressor for supplying high pressure atomizing fluid, such as air, to the fuel system of a turbine engine.

DESCRIPTION OF THE PREFERRED EMBODIMENT

Turning now to the FIGURE which schematically discloses apparatus 10 of the present invention, the apparatus 10 generally includes a turbine engine 12 with a turbine engine fuel system 13; and a turbocompressor 14 or blast-air turbocompressor, that supplies high pressure atomizing fluid, such as air, to the turbine engine fuel system 13 in a manner that overcomes the shortcomings associated with conventional high pressure atomizing systems discussed hereinabove. The first turbine 28 may in turn be operably connected to a generator 15 or other device that is adapted to be driven by a conventional turbine.

The turbine engine 12 is comprised of a first turbine 28 that is operably connected to a first fluid compressor 30 by common shaft 32. The first fluid compressor 30 is driven by the first turbine 28 in a conventional manner. Depending on the compressor fluid discharge pressure required by the fuel system, the first fluid compressor may have more than one compression stage. The first fluid compressor 30 and the first turbine 28 are of conventional design well known to one skilled in the pertinent art. The compressor 30 may be a conventional axial flow compressor or a centrifugal compressor. The turbine engine is a gas turbine engine employing the thermodynamic Brayton cycle well known to one skilled in the art of turbomachinery.

For purposes of clarity, it should be understood that the term "fluid" as used herein means any compressible fluid, including any compressible gas, such as air for example.

Turbine engine fuel system 13 includes a conventional combustor 40, that is flow connected to the first fluid compressor 30 and the first turbine 28. The combustor B, burns fuel supplied to the combustor through combustor fuel nozzles (not shown). The combustor is of conventional design well known to one skilled in the art. A suitable fuel such as a liquid fuel or a natural gas fuel is supplied to the combustor from a fuel tank 43 through a fuel supply line 42 that flow connects the fuel tank 43 and the combustor 40. During operation of engine 12, a volume of compressed fluid discharged from compressor 30 is supplied to the combustor 40 and is mixed with the fuel which is burned, and the heated compressed fluid is flowed to the first turbine and is used to drive the first turbine 28. The fuel system is represented schematically in the FIGURE however, it should be understood that the fuel system is of the type well known to one skilled in the art and includes the required conventional fuel pump or propulsion device for supplying the fuel to the combustor at the required mass flow rate; conventional fuel nozzles at the combustor; and any other conventional components required to supply fuel to the combustor in the required manner.

The turbine engine 12 is enclosed by an engine housing 20 that includes a compressor inlet 22, a compressor outlet 24, a primary atomizing fluid inlet 26, and a fluid inlet 27. The housing 20 encloses the first fluid compressor 30, first turbine 28, shaft 32 and fuel system 13 of turbine engine 12 represented schematically in the FIGURE.

Uncompressed ambient fluid, such as air, flows through the housing inlet 22 and into the fluid compressor 30 through compressor inlet 34, is compressed by the compressor and a first volume of compressed fluid is discharged from the compressor through compressor discharge port 36 and into first conduit 37.

The first conduit flow connects the first compressor discharge 36, with the intercooler 50, and with the combustor 40 and the first turbine 28. The first conduit includes a primary conduit segment 37a and a secondary conduit segment 37b shown in the FIGURE. During operation of apparatus 10, a first portion of the first compressed volume of fluid flows to the combustor through segment 37a, and a second portion of the first volume of compressed fluid flows through the intercooler through secondary conduit segment 37b. The first portion of compressed fluid flowed to the combustor through segment 37a is greater than the second portion of the first volume of compressed fluid flowed through conduit segment 37b.

Turbocompressor 14 is comprised of a second fluid compressor 60 and second turbine 62 which are connected to the ends of a common shaft 64. The second fluid compressor 60 is driven by the second turbine 62. The second fluid compressor 60, second turbine 62 and shaft 64 are enclosed by a turbocompressor housing 65 that includes second compressor inlet and discharge openings 66 and 67 and second turbine inlet and discharge openings 68 and 69.

A conventional intercooler 50 is flow connected to the first and second fluid compressors 30 and 60. The secondary segment 37b of first conduit 37 flow connects the intercooler discharge 51 with the inlet 53 of second fluid compressor 60. The intercooler serves to reduce the temperature of the atomizing fluid thus minimizing the prospect of fuel coking in the fuel system.

In addition to conduit 37, apparatus 10 includes second conduit 54 flow connects the combustor 40 and the discharge 55 of second fluid compressor 60; third conduit 56 that has an inlet end flow connected to the secondary segment 37b of first conduit 37, and a discharge end that is connected to the inlet 57 of second turbine 62; and fourth conduit 58 that flow connects the discharge 59 of second turbine 62 and the housing inlet 76.

Operation of the gas turbine apparatus of the present invention will now be described.

Ambient air is supplied to the first fluid compressor 30 through inlets 22 and 34, is compressed and a first volume of compressed fluid is discharged out discharge opening 36 to first conduit 37. A first large portion of the discharged first volume is flowed through primary conduit segment 37a to fuel system combustor 40 and is mixed with fuel that is also supplied to the combustor from fuel tank 43. After the fuel is burned, the hot compressed air flows out of the combustor 40 to the first turbine 28 and is used to drive the turbine. The first turbine 28 may be used to directly drive a generator 15.

As shown in the FIGURE, a second portion of the hot compressed air discharged from the compressor 30 not directed to combustor 40 continues through secondary conduit segment 37b. Before entering intercooler 50, a portion of the hot compressed fluid is diverted through third conduit 56 and is used to drive second turbine 62. The remainder of the hot compressed air in conduit segment 37b continues through intercooler 50 which cools the hot compressed gas before it flows to second compressor 60.

The air is compressed by compressor 60, and the second volume of compressed fluid is discharged out compressor through discharge outlet 55. The second volume of compressed fluid flows through second conduit 54 and is supplied to combustor 40, where it is mixed with the fuel and compressed air supplied through primary conduit segment 37a. The second volume of compressed fluid is atomizing fluid and helps to atomize fuel in the fuel system combustor.

The hot compressed air used to drive turbine 62 also referred to as a third volume of compressed fluid, flows through fourth conduit 58 and is introduced into housing 20 proximate the fuel system 13.

The apparatus 10 is especially configured for an application where a small portion of the turbine engine's main flow of the first volume of compressed fluid is diverted from the cycle through secondary segment 37b, is further compressed by second fluid compressor 60, and is injected into the fuel ports of the fuel system's combustor 40. The small volume of the main flow of the first volume of compressed fluid must be compressed by second compressor 60 by a pressure ratio of nominally 1.2 to overcome pressure losses in the apparatus distribution system and conduits and fuel nozzles. It is believed by the inventor that there would be no loss of cycle performance since the significant percentage (nominally 2%) of the main engine flow is not lost to the cycle, but rather continues as normal through the combustion chamber and turbines.

As discussed above, the drive power for this re-compression process is acquired by expanding a smaller fraction of the main engine air flow through the proposed turbocompressor's turbine section 62. This does represent a loss, but due to the relatively large difference between the expansion ratio available to the air-blast turbine and its slave compressor, its requisite mass flow is substantially lower than the air compressed. The ratio of compressed air to turbine bleed can be further increased by the use of an after cooler in front of the compressor. In this case, the work of the compressor is reduced.

A further enhancement of the concept is to utilize cooling effect created by the turbine expander to reduce the cooling load required by the intercooler. The thermodynamic potential would reduce the heat load from the intercooler by about 15%.

An alternative configuration of the apparatus 10 might utilize a small portion of the engine's waste heat to raise the temperature of the air consumed by the second turbine 62. This addition of enthalpy to the turbine inlet would further reduce the bleed air required in the blast turbine 62.

Preliminary calculations for a typical set of conditions indicate that the bleed air loss required to drive the blast-air turbine represents approximately 0.25–0.30 percent of the main engine flow. This is about 13–16% of the blast air pumped by the mated compressor section. In the majority of circumstances, this would not be considered detrimental to the engine.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

Having described the invention, what is claimed is:

1. An apparatus comprising:
    A) a turbine engine comprising: a first fluid compressor having a first fluid compressor inlet for flowing uncompressed fluid into the compressor, and a first fluid compressor discharge for flowing a first volume of compressed fluid out of the first fluid compressor; a first turbine operably connected to the first fluid compressor to drive the first fluid compressor, said first turbine having a first turbine inlet; the turbine engine further comprising a fuel system; and a first conduit flow connecting the fuel system to the first fluid compressor discharge and to the first turbine inlet, the first conduit having primary and secondary conduit segments, the first conduit adapted to supply a first portion of the volume of compressed fluid to the fuel system through the primary conduit segment;
    B) a blast air turbocompressor comprising a second fluid compressor driven by a second turbine, the second fluid compressor having a second fluid compressor inlet, and a second fluid compressor discharge for flowing a second volume of compressed fluid out of the second fluid compressor, said first conduit further flow connecting the first fluid compressor discharge and the second fluid compressor inlet by the secondary conduit segment, and wherein a second portion of the first volume of compressed fluid is supplied to the second fluid compressor through the secondary conduit segment; the second turbine comprising a second turbine inlet and a second turbine discharge;
    C) the apparatus further including a third flow conduit having an inlet end flow connected to the primary conduit segment and a discharge end flow connected to the second turbine inlet; and a fourth conduit having a first end flow connected to the second turbine discharge and a second end located adjacent the fuel system; and
    D) a second conduit flow connecting the second compressor fluid discharge and the fuel system and whereby the second volume of compressed fluid is supplied to the fuel system.

2. The apparatus as claimed in claim 1 wherein the fuel system is comprised of a fuel tank, a combustor located in the primary conduit segment, and a fuel supply line connecting the fuel tank and the combustor.

3. The apparatus as claimed in claim 1 wherein a cooler is flow connected to the first fluid compressor discharge to cool a volume of the compressed fluid.

4. The apparatus as claimed in claim 3 wherein the cooler is an intercooler and is located in the secondary conduit segment between the first and second fluid compressors.

5. The apparatus as claimed in claim 4 wherein the intercooler is flow connected to the discharge of first fluid compressor and to the inlet of the second fluid compressor.

6. The apparatus as claimed in claim 1 wherein the first portion of the first volume of compressed fluid is greater than the second portion of the first volume of compressed fluid.

7. The apparatus as claimed in claim 1 wherein the first portion of the first volume of compressed fluid is greater than the second portion of the first volume of compressed fluid.

8. The apparatus as claimed in claim 1 wherein the second volume of compressed fluid is atomizing air.

9. An apparatus comprising:
    A) a turbine engine having a fuel system, a first flow conduit for supplying a first volume of compressed fluid to the fuel system, and a second flow conduit, and
    B) turbocompressor means flow connected to the second flow conduit and the fuel system, said second flow conduit for supplying a second volume of compressed fluid to the turbocompressor means, said turbocompressor means for supplying a volume of compressed atomizing fluid to the turbine engine fuel system, the turbocompressor means comprising a turbine having a turbine inlet and a turbine discharge, C) the apparatus further comprising a third conduit flow connecting the second conduit and the turbine inlet for supplying a third volume of compressed fluid to the turbine; and a fourth conduit flow connecting the turbine discharge and the turbine engine.

10. The apparatus as claimed in claim 9 wherein the apparatus includes a cooler flow connected to the second flow conduit, said cooler for cooling the second volume of compressed fluid.

11. The apparatus as claimed in claim 10 wherein the cooler is an intercooler.

12. The apparatus as claimed in claim 9 wherein the turbine engine is a gas turbine engine that employs the thermodynamic Brayton Cycle.

13. The apparatus as claimed in 9 wherein the third volume of compressed fluid is atomizing air.

* * * * *